United States Patent
Fleissner

(10) Patent No.: US 7,365,304 B2
(45) Date of Patent: Apr. 29, 2008

(54) ANGULAR POSITION MEASURING DEVICE HAVING A MOVABLE STOP ELEMENT TO LIMIT THE AXIAL SPRING MOTION BETWEEN A MACHING PART AND A SECOND ASSEMBLY AND MEASURING SYSTEM HAVING SUCH AN ANGULAR POSITION MEASURING DEVICE

(75) Inventor: Claudia Fleissner, Altenmarkt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 59 days.

(21) Appl. No.: 11/508,807

(22) Filed: Aug. 22, 2006

(65) Prior Publication Data
US 2008/0001074 A1   Jan. 3, 2008

(30) Foreign Application Priority Data
Jun. 30, 2006   (DE) .................. 20 2006 010 183 U

(51) Int. Cl.
*G01D 5/34* (2006.01)
(52) U.S. Cl. .................. 250/231.13; 250/239
(58) Field of Classification Search .......... 250/231.13, 250/231.14, 231.18, 221, 239; 341/11, 13; 74/25, 33, 63
See application file for complete search history.

(56) References Cited

U.S. PATENT DOCUMENTS 2,574,603 A * 11/1951 Uhlig ..................... 192/142 A

FOREIGN PATENT DOCUMENTS

DE   103 43 727   4/2005

* cited by examiner

*Primary Examiner*—Que T Le
(74) *Attorney, Agent, or Firm*—Kenyon & Kenyon LLP

(57) ABSTRACT

An angular position measuring device includes two assemblies. The first assembly is rotatable with respect to the second assembly about an axis. A coupling is arranged at the second assembly, which has an elastic spring behavior in the direction of the axis. Furthermore, a stopping element is assigned to the angular position measuring device. The angular position measuring device is attachable to a machine part. If coupling is not prestressed, there is a free gap between the machine part and the second assembly, having an extension in the direction of the axis. The stopping element is able to be brought into a stopping position in which at least one region of the stopping element is in operative connection to the second assembly for the limitation of the axial spring motions. A measuring system includes such an angular position measuring device.

20 Claims, 4 Drawing Sheets

ANGULAR POSITION MEASURING DEVICE HAVING A MOVABLE STOP ELEMENT TO LIMIT THE AXIAL SPRING MOTION BETWEEN A MACHING PART AND A SECOND ASSEMBLY AND MEASURING SYSTEM HAVING SUCH AN ANGULAR POSITION MEASURING DEVICE

CROSS-REFERENCE TO RELATED APPLICATIONS

The present application claims priority to Application No. 20 2006 010 183.7, filed in the Federal Republic of Germany on Jun. 30, 2006, which is expressly incorporated herein in its entirety by reference thereto.

FIELD OF THE INVENTION

The present invention relates to an angular position measuring device and to a measuring system having such an angular position measuring device.

BACKGROUND INFORMATION

Angular position measuring devices, also frequently referred to as shaft encoders, are used for measuring rotary motions of a rotationally mounted member, particularly a shaft, over one or more revolutions (multiturn functioning). In so doing, the rotary motion is recorded incrementally or absolutely. In conjunction with gear racks and gear wheels or with threaded spindles, linear motions can also be measured by an angular position measuring device.

In order to adjust alignment errors, for example, between the shaft of an angular position measuring device and the shaft to be measured, couplings are frequently used. The shaft of the angular position measuring device can be fitted rigidly to the shaft to be measured. The coupling compensates for the axial and radial relative motions between the shaft to be measured and the measuring unit of the coupling, and it reduces the forces generated thereby. In order to avoid corruption of the measuring results, the respective coupling should behave in a manner that is resistant to rotation or is rotationally rigid.

An angular position measuring device is described in German Published Patent Application No. 103 43 727 in which a housing is able to be rigidly mounted on a machine part. A shaft is rotatably supported relative to the housing. For the compensation of mechanical inaccuracies, an elastic torque support is provided within the housing of the angular position measuring device. In order to stop the spring motions of the torque support, especially during the assembly or attachment of the angular position measuring device, the shaft is fixed with respect to the housing.

SUMMARY

Example embodiments of the present invention provide an angular position measuring device, which may permit reliable and quick assembly using simple devices, after assembly of the angular position measuring device the coupling functioning reliably.

An angular position measuring device according to an example embodiment of the present invention includes two assemblies, the first assembly being rotatable about an axis, with respect to the second assembly. A coupling is arranged at the second assembly which has an elastic spring behavior in the direction of the axis. The angular position measuring device, which is attachable to a machine part, also includes a stopping element. When there is no prestressed coupling, there is a free gap between the machine part and the second assembly having an extension in the direction of the axis, so that axial spring motions between the machine part and the second assembly is possible. The stopping element is able to be brought from a neutral position to a stopping position, in the stopping position at least one region of the stopping element being in operative connection to the second assembly, to limit the axial spring motions between the machine part and the second assembly.

According to an example embodiment of the present invention, a measuring system includes such an angular position measuring device, a machine part and a stopping element that is arranged on the angular position measuring device or the machine part.

The machine part may, for example, be arranged as a flange, which is able to be fixed on a machine in a manner rigid or resistant to rotation. This method of construction may provide that the coupling is mounted on the flange, by the manufacturer of the angular position measuring device, which is within the scope of supply of the appropriate manufacturer. However, example embodiments of the present invention also includes systems in which the angular position measuring device is fastened directly to the respective machine, such as in a housing of an electric motor. In the latter case, the coupling is fastened directly onto the machine.

It should be appreciated that a neutral position includes a position of the stopping element in which the stopping element does not impede the axial spring motions of the coupling. In the stopping position, a compression of the coupling, in the sense of a reduction in the gap between the machine part and the second assembly is at least limited. Even in the stopping position, a spring motion in a direction opposite thereto may possibly be allowable.

The angular position measuring device and the measuring system may be arranged such that the at least one region of the stopping element is in a form- or positive-locking operative connection to the second assembly. For example, the at least one region for limiting the axial spring motion is able to be applied in the gap between the machine part and the coupling.

The region of the stopping element, which is able to be applied in the gap, may have an extension in the direction of the axis which is smaller than the extension of the free gap.

The operative connection of the stopping element to the second assembly may be arranged such, in the stopping position, axial spring motions that result in a reduction in the gap, are prevented.

In other words, in the stopping position, a compression of the coupling, in the sense of a reduction in the gap, may be prevented.

The first assembly may include a fastening device for fastening, in a manner rigid to rotation, a machine element to the angular position measuring device, and the operation of the fastening device causes a load on the angular position measuring device at a force that has a directional component parallel to the axis. The fastening device may be arranged as a screw that is rotatable about a screw axis which has a directional component parallel to the axis. When the respective screw is rotated, a force is directed onto the coupling that results in a deformation of the coupling, which has the effect of decreasing the gap. Consequently, there is the danger that, after the mounting of the angular position measuring device and the measuring system, the coupling is stressed and no longer makes possible the originally planned spring excursion.

The measuring system may be arranged such that the angular position measuring device and/or the machine part are configured such that the stopping element is able to be operated while accessible from the axial direction. This means that, even in the case of a radially limited installation situation, the stopping element is able to be transferred into the stopping position, or from the stopping position into a neutral position. This is significant if the measuring system and the angular position measuring device is installed into a recess, so that the measuring system and the angular position measuring device is, for example, surrounded on all sides by a wall.

The stopping element may be articulatable about an axis of rotation for the purpose of transferring from the neutral position to the stopping position. In this context, the axis of rotation of the stopping element may have a directional component parallel to the axis of the angular position measuring device.

The stopping element may have an additional region which is used as a stop for the limitation of the maximum mobility of the stopping element. Moreover, the stopping element is able to be mounted in a recess of the machine part, the recess being able to act as a guide. Furthermore, the recess is able to be arranged as a bore, so that the axis of rotation of the stopping element coincides with the axis of the bore. For example, the stopping element is able to be oversized with respect to the recess of the machine part. This means that the respective outer diameter of the relevant part of the stopping element is greater than the inner diameter of the recess or the bore. In this manner, a certain stiffness of the stopping element may be ensured, so that the stopping element does not change its position on its own, for example, in response to vibrations, and, for example, does not change to the stopping position by itself.

According to an example embodiment of the present invention, an angular position measuring device includes: a first assembly and a second assembly, the first assembly rotatable with respect to second assembly about an axis; a coupling arranged on the second assembly having an elastic spring behavior in a direction of the axis; and a stop element. The angular position measuring device is attachable to a machine part. For a non-prestressed coupling, a free gap is located between the machine part and the second assembly extending in the direction of the axis to provide axial spring motion between the machine part and the second assembly, and the stop element is movable between a neutral position and a stop position, in which at least one region of the stop element is in operative connection to the second assembly to limit the axial spring motion between the machine part and the second assembly.

In the stop position, the at least one region of the stop element may be in form-locking operative connection to the second assembly.

The at least one region of the stop element may be movable into the gap to limit the axial spring motion.

The at least one region of the stop element may include a thickness in the direction of the axis less than the width of the gap in the direction of the axis.

The operative connection of the stop element to the second assembly may be adapted to prevent, in the stop position, axial spring motion that results in a reduction in the gap.

The first assembly may include a fastener device adapted to fasten a machine element on the angular position measuring device in a rotationally-resistant manner, operation of the fastener device causing a stressing of the angular position measuring device with a force having a directional component parallel to the axis.

The fastener device may include a screw rotatable about a screw axis having a directional component parallel to the axis.

According to an example embodiment of the present invention, a measuring system includes: an angular position measurement device; a machine part; and a stop element arranged on one of (a) the angular position measurement device and (b) the machine part. The angular position measurement device includes: a first assembly; a second assembly, the first assembly rotatable with respect to the second assembly about an axis; and a coupling arranged on the second assembly having a spring behavior in a direction of the axis. For a non-prestressed coupling, a free gap is located between the machine part and the second assembly having an extension in the direction of the axis to provide axial spring motion between the machine part and the second assembly. The stop element is movable from a neutral position to a stop position, in which at least one region of the stop element is in operative connection to the second assembly to limit the axial spring motion between the machine part and the second assembly.

In the stop position, the at least one region of the stop element may be in form-locking operative connection to the second assembly.

The at least one region of the stop element may be movable into the gap to limit the axial spring motion.

The at least one region of the stop element may have a thickness in the direction of the axis less than a width of the free gap in the direction of the axis.

The operative connection of the stop element to the second assembly may be adapted to prevent, in the stop position, axial spring motion that results in a reduction in the gap.

The first assembly may include a fastener device adapted to fasten a machine element on the angular position measurement device in a rotationally-resistant manner, operation of the fastener device causing a stressing of the angular position measurement device with a force having a directional component parallel to the axis.

The fastener device may include a screw rotatable about a screw axis having a directional component parallel to the axis.

At least one of (a) the angular position measurement device and (b) the machine part may be arranged so that the stop element is operable while accessible from an axial direction.

The stop element may be pivotable about an axis of rotation to move from the neutral position to the stop position.

The axis of rotation of the stop element may include a directional component parallel to the axis.

The stop element may be movably mounted in a recess of the machine part.

The recess may be arranged as a bore, and an axis of rotation of the stop element may coincide with an axis of the bore.

The stop element may be oversized with respect to the recess.

Other features and aspects of example embodiments of the present invention are described in more detail below with reference to the appended Figures.

DETAILED DESCRIPTION

Figure 1:
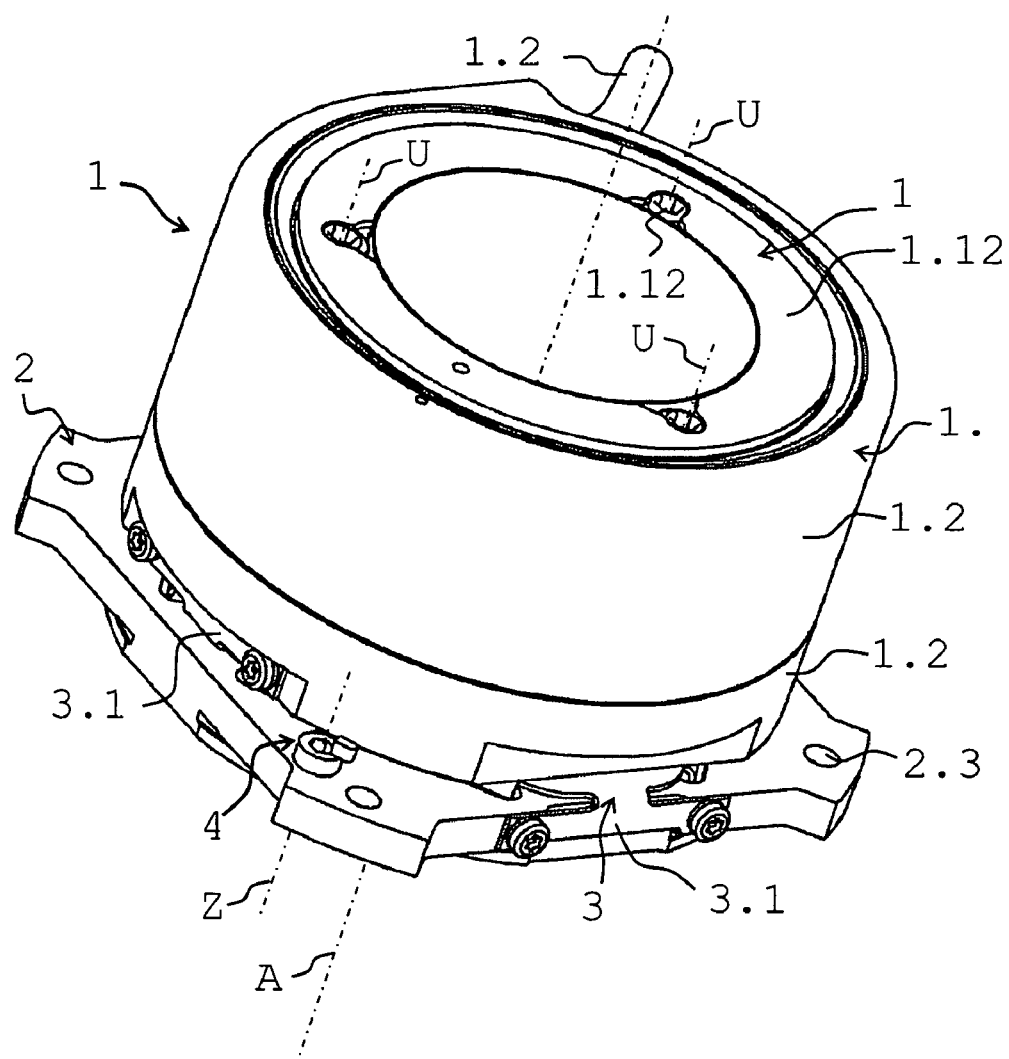
FIG. 1 is a perspective view of a measuring system.
Figure 2A:
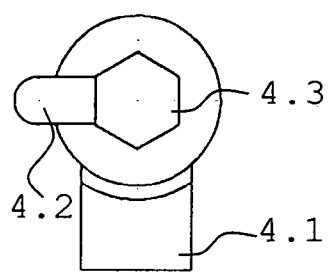
FIG. 2a is a top view of a stopping element.
Figure 2B:
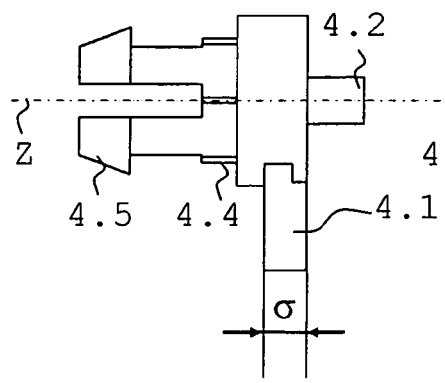
FIG. 2b is a side view of the stopping element.
Figure 2C:
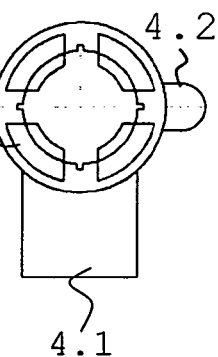
FIG. 2c is a view of the stopping element from below.
Figure 2D:
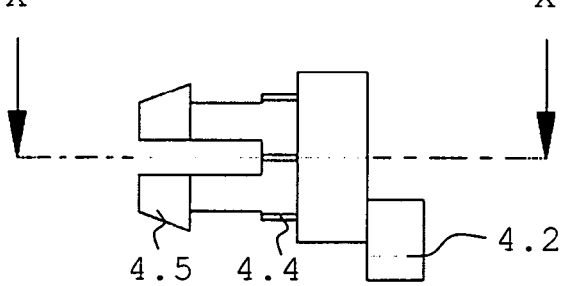
FIG. 2d is an additional side view of the stopping element.
Figure 2E:
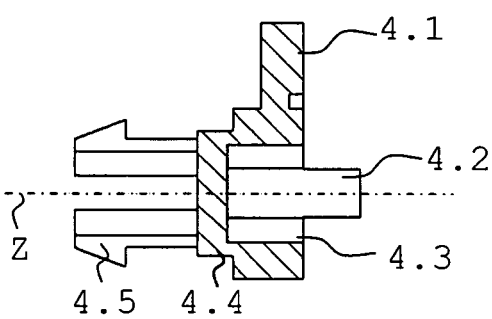
FIG. 2e is a cross-sectional view of the stopping element.

FIG. 1 is a perspective view of a measuring system, which includes an angular position measuring device 1 and a machine part arranged as a flange 2.

Angular position measuring device 1 includes a first assembly 1.1 and a second assembly 1.2. The two assemblies 1.1, 1.2 are arranged rotatable with respect to each other about axis A.

Figure 3A:
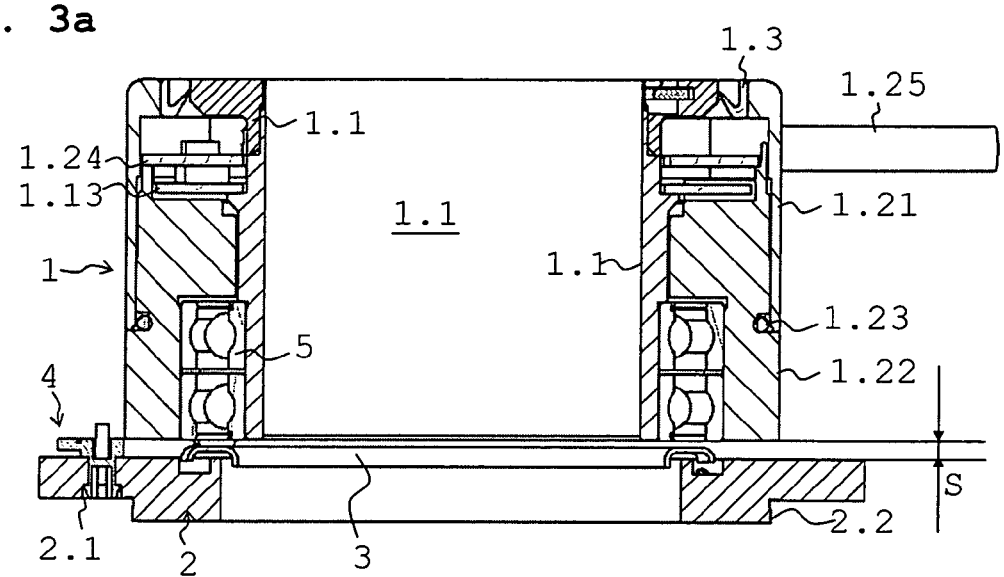
FIG. 3a is a cross-sectional view of the measuring system having the stopping element in a neutral position.
Figure 3B:
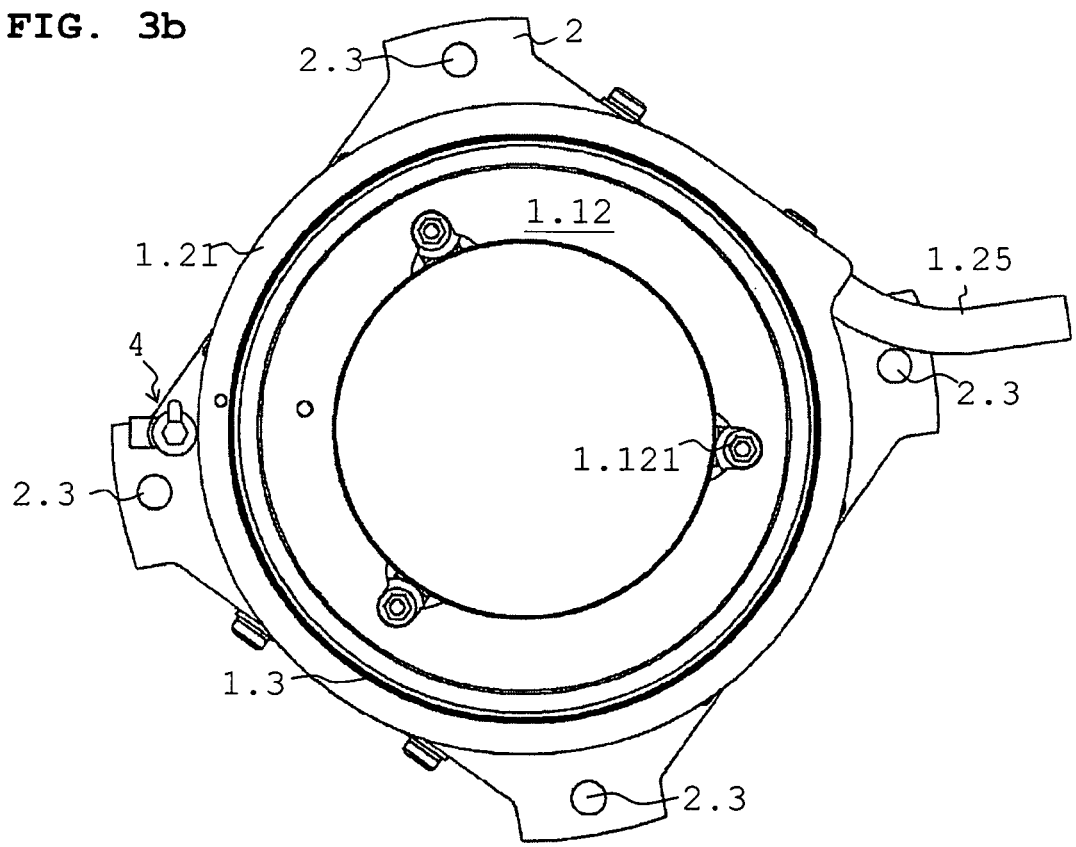
FIG. 3b is a top view of the measuring system having the stopping element in the neutral position.
Figure 4A:
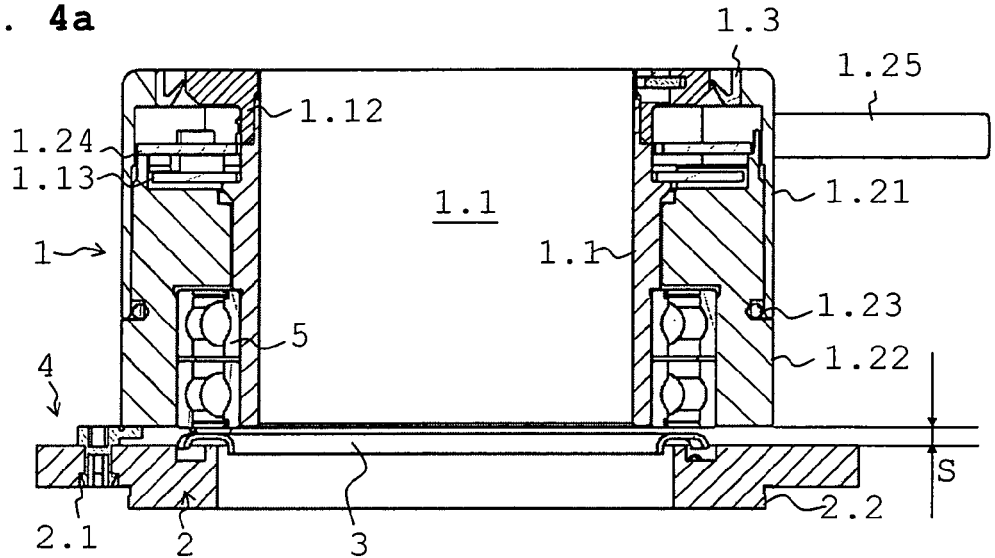
FIG. 4a is a cross-sectional view of the measuring system having the stopping element in a stopping position.

As illustrated in FIGS. 3a and 4a, first assembly 1.1 includes a hollow shaft 1.11 and a clamp ring 1.12. Hollow shaft 1.11 is used for accommodating a machine element, which is arranged as a shaft whose angular setting is to be measured. Using clamp screws 1.121 (FIGS. 1, 3b, 4b), the shaft to be measured is able to be fastened by clamps in hollow shaft 1.11, with the aid of an eccentric device. For reasons of accessibility, the fixing device should be operable from the axial direction. Therefore, clamp screws 1.121 are arranged such that their axes of rotation U are aligned in parallel to axis A. Therefore, in order to clamp first assembly 1.1 to the shaft to be measured, when applying a tool, e.g., a hexagon socket key, an axial force is exerted on angular position measuring device 1. After the clamping, first assembly 1.1 rotates along with the shaft to be measured and is connected rigidly with the shaft that is to be measured. Consequently, in the exemplary embodiment illustrated, first assembly 1.1 may also be designated as a rotor.

In addition, at first assembly 1.1, a graduated disk 1.13 is fastened (FIGS. 3a, 4a), which has an angle scaling and which rotates together with hollow shaft 1.11. Antifriction bearings 5 are provided to make possible the rotatability of first assembly 1.1 relative to second assembly 1.2.

In the exemplary embodiment illustrated, second assembly 1.2 is arranged as a stator. Second assembly 1.2 includes a cap 1.21 which is fastened to a base member 1.22. In order to seal the joint gap between cap 1.21 and base member 1.22, an O-ring 1.23 is provided. Angular position measuring device 1 operates according to an optical principle. On base member 1.22, a substantially annular circuit board 1.24 is fixed on which, among other things, photodetectors and electronic components for processing the signals generated by the photodetectors are placed. In addition, on base member 1.22 there is an illuminating unit. The light of the illuminating unit, modulated by graduated disk 1.13 as a function of the angle, is transformed by the photodetectors into electrical signals, which are processed further by the electronic components and are supplied via a cable 1.25 to an additional electronics system of a separate unit. A seal 1.3 protects the components of the measuring technical system, especially graduated disk 1.13 and circuit board 1.24, from contamination.

In the exemplary embodiment illustrated, angular position measuring device 1 is intended to be flanged to a motor. For this purpose, measuring system 1 has a flange 2. Flange 2 is able to be attached rigidly to the appropriate motor with the aid of a centering collar 2.2.

To adjust alignment errors or radial offset between hollow shaft 1.11 of angular position measuring device 1 and the shaft that is to be measured, a coupling 3 is provided. This includes four tabs 3.1, two of the tabs 3.1 being fastened at second assembly 1.2 and the other pair is fixed to flange 2. Hollow shaft 1.11 of angular position measuring device 1 is thereby able to be attached rigidly to the shaft that is to be measured. Coupling 3 compensates for the axial and radial relative motions between the shaft to be measured and the measuring unit of angular position measuring device 1, and it reduces the forces generated thereby. In order that the measuring results are not corrupted, the respective coupling 3 behaves in a manner that is resistant to rotation.

For a non-prestressed coupling 3, there is a free gap S between flange 2 and second assembly 1.2, having an extension in the direction of axis A, to make possible axial spring motions between flange 2 and second assembly 1.2.

In a bore 2.1 of flange 2, a stopping element 4 is inserted which is rotatable about an axis of rotation Z with respect to flange 2. Stopping element 4, which in the example embodiments illustrated is arranged as a one-piece extruded plastic part, includes, as illustrated in FIGS. 2a to 2e, a clip element 4.5 which provides axial security of stopping element 4 and at the same time makes possible its rotatability in bore 2.1. In order that stopping element 4 stays in the respectively desired rotary position, four ribs 4.4 are arranged on stopping element 4, which are dimensioned such that there is an oversize with respect to bore 2.1. When stopping element 4 is inserted into bore 2.1, ribs 4.4 deform somewhat, so that corresponding frictional forces are created at the inner wall of bore 2.1, which prevent an independent rotation of stopping element 4. Stopping element 4 also includes a first region 4.1 having a thickness σ, which is able to be inserted into gap S. In addition, stopping element 4 has a recess 4.3 for accommodating a tool, as well as a second region 4.2 which is used as a stop.

If, for example, the measuring system is to be fastened to a motor, hollow shaft 1.11 is first pushed over the motor shaft to be measured. Screws are pushed through bores 2.3 on flange 2, and screwed into inner threads on the motor housing that were prepared for it. Thereby, flange 2 may be connected rigidly to the motor housing. Via coupling 3, second assembly 1.2 is fastened, resistant to rotation, to flange 2, but it is fastened in an axially springy manner.

In order to achieve a firm connection between the shaft of the motor that is to be measured and hollow shaft 1.11, clamp screws 1.121 have to be turned. As was mentioned, in this process, angular position measuring device 1 is stressed, which results in a deformation of coupling 3, so that the clamping would take place in response to deformed coupling 3. This would bring with it a worse functioning of coupling 3 in the operation of the measuring system, since the axial spring excursion would be reduced.

Figure 4B:
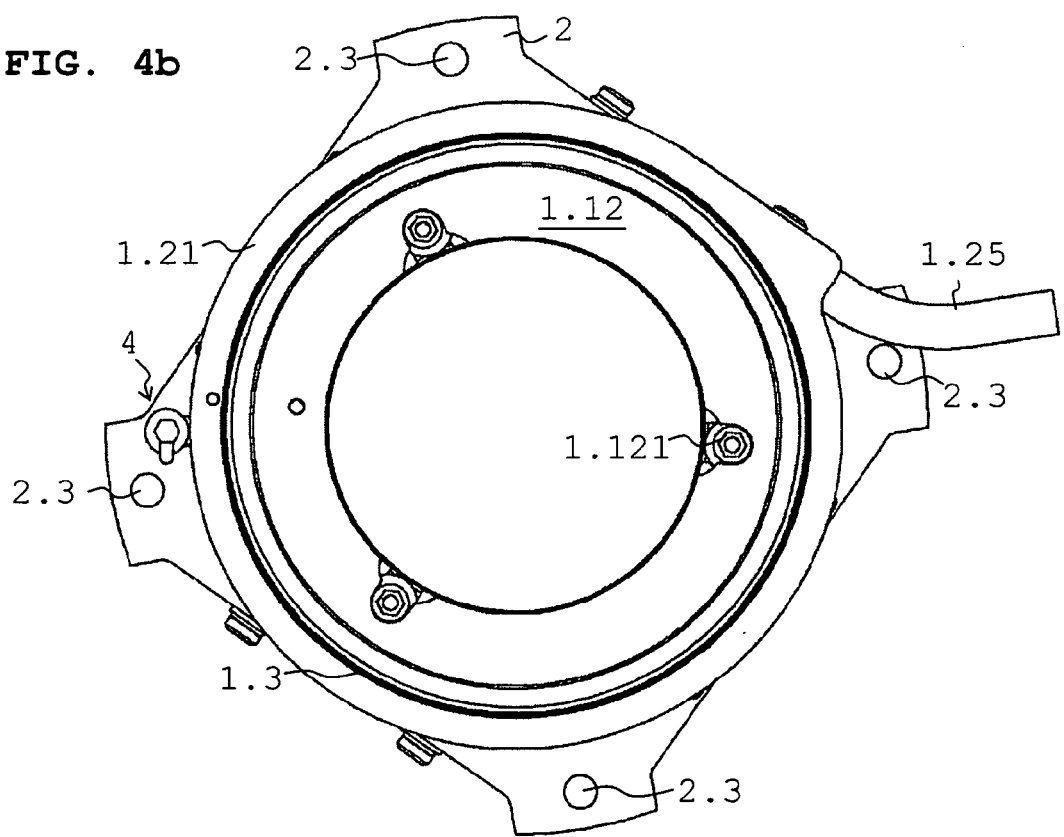
FIG. 4b is a top view of the measuring system having the stopping element in the stopping position.

In order to avoid this effect, before clamp screws 1.121 are operated, stopping element 4 is brought from a neutral position as illustrated in FIGS. 1, 3a and 3b into a stopping position, as illustrated in FIGS. 4a and 4b. This is accomplished using a hexagon socket key which penetrates into recess 4.3 and by which stopping element 4 is rotated. In the stopping position, first region 4.1 of stopping element 4 is introduced into gap S between flange 2 and coupling 3, for limiting the axial spring motion. For example, first region 4.1 of stopping element 4 is in form-locking operative connection with second assembly 1.2, in that the upper surface of first region 4.1 is in touch with the lower surface of base element 1.22. The operative connection of stopping element 4 to second assembly 1.2 may be arranged such, in the stopping position, axial spring motions that result in a reduction in gap S, are completely prevented. Thus, coupling 3 cannot be compressed by the requisite pressure of hexagon socket key, because the pressure forces are dissipated via stopping element 4 in flange 2. Stopping in the opposite direction, so that a tensile stress of coupling 3 would be avoided, is not necessary, and therefore stopping element 4 thus has no such functionality.

Clamp screws 1.121 are able to be turned at simultaneous force action in the direction of axes U of clamp screws 1.121, without compression of coupling 3 taking place, since, because of stopping element 4, the axial spring motions between flange 2 and second assembly 1.2 are limited. In this context, it is sufficient that only one stopping element 4 is provided, because tipping angular position measuring device 1 by pushing hollow shaft 1.11 onto the shaft to be measured is prevented. As a result of the comparatively large frictional force between stopping element 4 and the inner wall of bore 2.1, stopping element 4 remains securely in its stopping position.

As soon as first assembly 1.1 of angular position measuring device 1 is fastened to the shaft to be measured in a clamping manner, stopping element 4 may again be brought to the neutral position as illustrated in FIGS. 1, 3a and 3b by rotation about axis of rotation Z, so that second assembly 1.2 is able to move again in a springy manner in the axial direction, free relative to flange 2. In order to avoid stopping element 4 being rotated too far in error, stop 4.2 on stopping element 4 is provided, which, if necessary, touches base element 1.22. In operation, it is provided that, because of the oversize of ribs 4.4 with respect to bore 2.1, stopping element 4 is not able to return independently to the stopping position, even in response to vibrations.

The measuring system may be arranged such that angular position measuring device 1 and flange 2 are configured so that stopping element 4 is able to be operated while accessible from the axial direction, since the installer is able to guide the tool (e.g., hexagon socket key), for the operation of stopping element 4, along cap 1.21. Even in response to radially limited installation situations, stopping element 4 may thus be brought into the stopping position and again to the neutral position. Axial accessibility may be required for the remaining mounting steps for the attachment of angular position measuring device 1.

If the installer accidentally leaves stopping element 4 in the stopping position, and the measuring system goes into operation in this state, first region 4.1 of angular position measuring device 1 may be cut off from stopping element 4 independently as a result of shocks. In order to fulfill this function, first region 4.1 of stopping element 4, which is able to be inserted into gap S, has an extension σ in the direction of axis A, which is less than free gap S.

What is claimed is:

1. An angular position measuring device, comprising:
a first assembly and a second assembly, the first assembly rotatable with respect to second assembly about an axis;
a coupling arranged on the second assembly having an elastic spring behavior in a direction of the axis; and
a stop element;
wherein the angular position measuring device is attachable to a machine part;
wherein, for a non-prestressed coupling, a free gap is located between the machine part and the second assembly extending in the direction of the axis to provide axial spring motion between the machine part and the second assembly; and
wherein the stop element is movable between a neutral position and a stop position, in which at least one region of the stop element is in operative connection to the second assembly to limit the axial spring motion between the machine part and the second assembly.

2. The angular position measuring device according to claim 1, wherein, in the stop position, the at least one region of the stop element is in form-locking operative connection to the second assembly.

3. The angular position measuring device according to claim 1, wherein the at least one region of the stop element is movable into the gap to limit the axial spring motion.

4. The angular position measuring device according to claim 3, wherein the at least one region of the stop element includes a thickness in the direction of the axis less than the width of the gap in the direction of the axis.

5. The angular position measuring device according to claim 1, wherein the operative connection of the stop element to the second assembly is adapted to prevent, in the stop position, axial spring motion that results in a reduction in the gap.

6. The angular position measuring device according to claim 1, wherein the first assembly includes a fastener device adapted to fasten a machine element on the angular position measuring device in a rotationally-resistant manner, operation of the fastener device causing a stressing of the angular position measuring device with a force having a directional component parallel to the axis.

7. The angular position measuring device according to claim 6, wherein the fastener device includes a screw rotatable about a screw axis having a directional component parallel to the axis.

8. A measuring system, comprising:
an angular position measurement device;
a machine part; and
a stop element arranged on one of (a) the angular position measurement device and (b) the machine part;
wherein the angular position measurement device includes:
a first assembly;
a second assembly, the first assembly rotatable with respect to the second assembly about an axis; and
a coupling arranged on the second assembly having a spring behavior in a direction of the axis;
wherein, for a non-prestressed coupling, a free gap is located between the machine part and the second assembly having an extension in the direction of the axis to provide axial spring motion between the machine part and the second assembly; and
wherein the stop element is movable from a neutral position to a stop position, in which at least one region of the stop element is in operative connection to the second assembly to limit the axial spring motion between the machine part and the second assembly.

9. The measurement system according to claim 8, wherein, in the stop position, the at least one region of the stop element is in form-locking operative connection to the second assembly.

10. The measurement system according to claim 8, wherein the at least one region of the stop element is movable into the gap to limit the axial spring motion.

11. The measurement system according to claim 10, wherein the at least one region of the stop element has a thickness in the direction of the axis less than a width of the free gap in the direction of the axis.

12. The measurement system according to claim 8, wherein the operative connection of the stop element to the second assembly is adapted to prevent, in the stop position, axial spring motion that results in a reduction in the gap.

13. The measurement system according to claim 8, wherein the first assembly includes a fastener device adapted to fasten a machine element on the angular position measurement device in a rotationally-resistant manner, operation of the fastener device causing a stressing of the angular position measurement device with a force having a directional component parallel to the axis.

14. The measurement system according to claim 13, wherein the fastener device includes a screw rotatable about a screw axis having a directional component parallel to the axis.

15. The measurement system according to claim 8, wherein at least one of (a) the angular position measurement device and (b) the machine part is arranged so that the stop element is operable while accessible from an axial direction.

16. The measurement system according to claim 8, wherein the stop element is pivotable about an axis of rotation to move from the neutral position to the stop position.

17. The measurement system according to claim 16, wherein the axis of rotation of the stop element includes a directional component parallel to the axis.

18. The measurement system according to claim 8, wherein the stop element is movably mounted in a recess of the machine part.

19. The measurement system according to claim 18, wherein the recess is arranged as a bore and an axis of rotation of the stop element coincides with an axis of the bore.

20. The measurement system according to claim 18, wherein the stop element is oversized with respect to the recess.

\* \* \* \* \*